(Model.)

W. E. HOYT.
WAREHOUSE TRUCK.

No. 286,303. Patented Oct. 9, 1883.

Attest.
Geo. T. Smallwood.
J. Henry Kaiser.

Inventor
William E. Hoyt

UNITED STATES PATENT OFFICE.

WILLIAM E. HOYT, OF BELLAIRE, OHIO.

WAREHOUSE-TRUCK.

SPECIFICATION forming part of Letters Patent No. 286,308, dated October 9, 1883.

Application filed July 24, 1883. (Model.)

*To all whom it may concern:*

Be it known that I, W. E. HOYT, of Bellaire, in the county of Belmont and State of Ohio, have invented new and useful Improvements on Warehouse-Trucks; and I do hereby declare that the following is a full, clear, and exact description of the construction and operation of the same, reference being had to the accompanying drawings, and to the letters of reference marked thereon—

Figure 1:
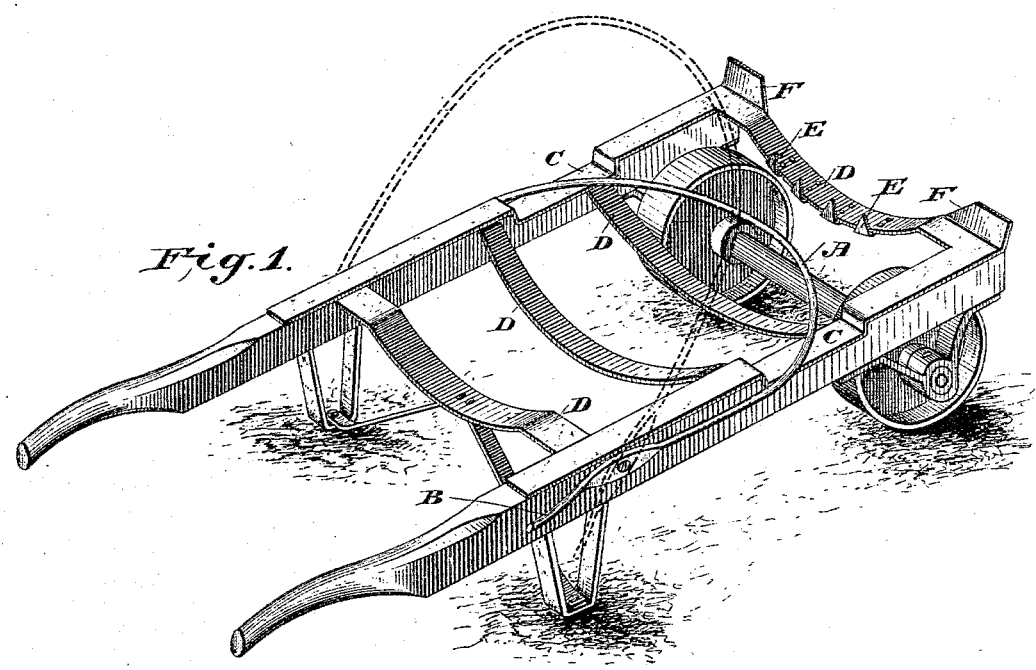
Figure 2:
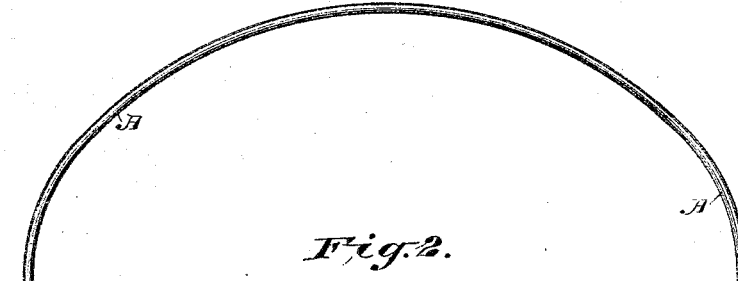

Figure 1 being a perspective, and Fig. 2 an end view, of the truck.

The nature of my invention consists in providing the truck with an elliptical band of metal, (marked A in accompanying drawings,) which moves on pivots set in the side of the truck a few inches forward of the legs, and is so constructed that by the movement of a lever (designated by B in drawings) which is a continuation of the elliptical band below the right side of the truck it will embrace the box, barrel, or other burden, and hold it firmly in place; also, in the notches or slots in the sides of the truck, (marked C in drawings,) whereby when the elliptical band is not in use it may be dropped down below the level of the surface of the truck and be out of the way; also, in connecting together the sides of the truck by curved cross-pieces for the accommodation of curved objects—such as barrels, kegs, &c. The cross-pieces are designated by D in drawings; also, in the movable metal teeth fastened by bolts to the forward cross-pieces, which are designed to fasten themselves into the curved burdens, and can be removed at pleasure for the purpose of sharpening them. These are marked E in drawings; also, in the catches forming part of the forward cross-piece, by means of which square burdens can be held in place. These are marked F in drawings.

What I claim as my invention, and desire to secure by Letters Patent, is—

In a truck, the combination of the elliptical band, with its handle, the notches in side pieces, the curved cross-pieces, the removable metal teeth, and the catches on the front end of the truck.

WILLIAM E. HOYT.

Witnesses:
   H. C. HUNTEMANN,
   W. E. STEARNS.